(12) United States Patent
Shimamura

(10) Patent No.: US 11,069,068 B2
(45) Date of Patent: Jul. 20, 2021

(54) IMAGE PROCESSING APPARATUS THAT PERFORMS MULTI-CROP PROCESSING, METHOD OF GENERATING IMAGE IN UNITS OF DOCUMENTS BY MULTI-CROP PROCESSING AND STORAGE MEDIUM

(71) Applicant: CANON KABUSHIKI KAISHA, Tokyo (JP)

(72) Inventor: Koya Shimamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 16/411,599

(22) Filed: May 14, 2019

(65) Prior Publication Data
US 2019/0362498 A1 Nov. 28, 2019

(30) Foreign Application Priority Data
May 25, 2018 (JP) .............................. JP2018-100331

(51) Int. Cl.
G06T 7/13 (2017.01)
G06T 7/174 (2017.01)
G06T 7/73 (2017.01)
G06T 3/40 (2006.01)
H04N 1/60 (2006.01)
H04N 1/00 (2006.01)

(52) U.S. Cl.
CPC ................ *G06T 7/13* (2017.01); *G06T 3/403* (2013.01); *G06T 7/174* (2017.01); *G06T 7/74* (2017.01); *H04N 1/00167* (2013.01); *H04N 1/60* (2013.01); *G06T 2207/10008* (2013.01); *G06T 2207/20132* (2013.01); *G06T 2207/30176* (2013.01)

(58) Field of Classification Search
CPC combination set(s) only.
See application file for complete search history.

(56) References Cited

U.S. PATENT DOCUMENTS

| 5,028,991 A | * | 7/1991 | Sekizawa | ............. H04N 1/3872 |
| | | | | 358/537 |
| 5,097,517 A | * | 3/1992 | Holt | ......................... G06K 9/00 |
| | | | | 382/137 |
| 5,649,025 A | * | 7/1997 | Revankar | ................. G06K 9/38 |
| | | | | 358/466 |

(Continued)

FOREIGN PATENT DOCUMENTS

| JP | 2003338920 A | 11/2003 |
| JP | 2017103593 A | 6/2017 |

*Primary Examiner* — Tsung Yin Tsai
(74) *Attorney, Agent, or Firm* — Rossi, Kimms & McDowell LLP

(57) ABSTRACT

To make it possible to cut out an image area corresponding to a document with a high accuracy from an image obtained by scanning a document without forcing a user to perform complicated work or without giving a feeling of discomfort at the time of performing multi-crop processing. To this end, first, position information on the document is acquired by detecting an edge component from a first image obtained by setting high the first white reference value. Then, an image area corresponding to the document is cut out based on the acquired position information from a second image obtained by setting the second white reference value lower than the first white reference value.

12 Claims, 13 Drawing Sheets

(56) References Cited

U.S. PATENT DOCUMENTS

| | | | | |
|---|---|---|---|---|
| 6,721,465 B1* | 4/2004 | Nakashima | ............. | G06K 9/20 |
| | | | | 358/474 |
| 7,064,874 B2* | 6/2006 | Imai | .................. | H04N 1/00912 |
| | | | | 358/447 |
| 8,199,357 B2* | 6/2012 | Miyagi | .................... | H04N 1/40 |
| | | | | 358/1.18 |
| 8,970,920 B2* | 3/2015 | Nakamura | ........... | H04N 1/4074 |
| | | | | 358/474 |
| 9,807,280 B2* | 10/2017 | Misawa | ................ | G06K 9/342 |
| 10,354,352 B2* | 7/2019 | Otake | ................ | H04N 1/40012 |
| 2001/0014183 A1* | 8/2001 | Sansom-Wai | ........ | H04N 1/3878 |
| | | | | 382/289 |
| 2003/0072495 A1* | 4/2003 | Maki | ................... | H04N 1/4076 |
| | | | | 382/254 |
| 2006/0082794 A1* | 4/2006 | Simske | ............. | H04N 1/40068 |
| | | | | 358/1.2 |
| 2006/0215232 A1* | 9/2006 | Ziv-el | ................. | H04N 1/3873 |
| | | | | 358/448 |
| 2009/0086294 A1* | 4/2009 | Sakakibara | ........ | H04N 1/40062 |
| | | | | 358/514 |
| 2009/0175537 A1* | 7/2009 | Tribelhorn | .......... | G06K 9/3233 |
| | | | | 382/173 |
| 2011/0002015 A1* | 1/2011 | Hayakawa | ......... | H04N 1/00816 |
| | | | | 358/448 |
| 2011/0310414 A1* | 12/2011 | Morimoto | .......... | H04N 1/00737 |
| | | | | 358/1.9 |
| 2012/0093434 A1* | 4/2012 | Banerjee | ................ | G06T 7/136 |
| | | | | 382/266 |
| 2013/0182002 A1* | 7/2013 | Macciola | ............. | H04N 1/387 |
| | | | | 345/589 |
| 2018/0234577 A1 | 8/2018 | Mizude | | |
| 2019/0191037 A1* | 6/2019 | Tsukahara | .......... | H04N 1/00087 |
| 2019/0370539 A1* | 12/2019 | Shimamura | .......... | H04N 1/3873 |

* cited by examiner

NORMAL SCAN

DARK READ SCAN

Statement of delivery

Slip No.: A123

To ABCDE Inc.
Person in charge  Hanako Yamada
Tel:0123-456-789
Fax:0123-456-789

AIUEO Inc.
Person in charge  Tanaka
Tel:0123-456-789
Fax:0123-456-789

| NO. | Product No. | Item | Unit price | Quantity | Amount |
|---|---|---|---|---|---|
| 1 | 1234 | A parts | ¥10,000 | 3 | ¥30,000 |
| 2 | 9876 | Product B | ¥5,000 | 1 | ¥5,000 |
| 3 | | | | | |
| 4 | | | | | |
| | | | | Total | ¥35,000 |

Receipt

May 10, 2016

To ABCDE Inc.

¥30,000-

For A product

AIUEO Inc.
Person in charge  Tanaka

Receipt

May 7, 2016

¥5,000-  For B product

To ABCDE Inc.

AIUEO Inc.
Person in charge  Tanaka

FIG.9

Scan then transmit

Document detection results display

Three documents are cut out

First document

Second document

Third document

FIG.13

IMAGE PROCESSING APPARATUS THAT PERFORMS MULTI-CROP PROCESSING, METHOD OF GENERATING IMAGE IN UNITS OF DOCUMENTS BY MULTI-CROP PROCESSING AND STORAGE MEDIUM

BACKGROUND OF THE INVENTION

Field of the Invention

The present invention relates to a scan technique of a document.

Description of the Related Art

Conventionally, data of an image obtained by scanning a document by using a multi function printer or the like including a scanner function is managed by saving the data in an internal storage (BOX saving function), transmitting the data to a server (SEND function), and so on. Then, an MFP exists having a function (multi-crop function) to generate an image in units of documents from a scanned image obtained by simultaneously scanning a plurality of documents whose size is small, such as a receipt and a name card. By making use of the multi-crop function, it is possible to generate images of a plurality of documents by one scan.

In the above-described multi-crop function, images in units of documents are generated by extracting the edge of each document from an image obtained by scanning a document and cutting out an image area corresponding to each document. Here, in a case where a scan is performed for a document of a regular size, such as A4 and A3, as a target, a user performs work in a procedure in which a user places a document on a document table (pressure plate), closes a while document table cover, and presses down a button to give instructions to start execution of a scan. In a scanned image obtained in this manner, all the white portions brighter than predetermined white are replaced with white of the same signal value. That is, the white of the document table cover and the white of the document are represented by quite the same density value, and therefore, as a result of this, there is such a problem that the edge of a document is hard to extract. Regarding this point, for example, Japanese Patent Laid-Open No. 2003-338920 has disclosed a technique to make it easy to extract the edge of each document by performing a can by covering the document table by a black sheet after placing a document. Further, Japanese Patent Laid-Open No. 2017-103593 has disclosed a technique to make it easy to extract the edge of a document by performing a scan in the state where the document table cover is left open and outputting areas other than the area in which the document is placed in black.

However, in a case of the technique of Japanese Patent Laid-Open No. 2003-338920, a user is forced to perform work in a procedure different from that at the normal time. Then, in a case of the technique of Japanese Patent Laid-Open No. 2017-103593, the document table cover is left open, and therefore, the light at the time of a scan enters the eyes of a user and a feeling of discomfort is given to the user. Further, it is frequent for a receipt to have a fold and to be bent, and therefore, there is such a problem that it is not possible to perform a scan appropriately unless the document is pressed by a document table cover.

Consequently, an object of the present invention is to cut out an image area corresponding to a document with a high accuracy from an image obtained by scanning the document without forcing a user to perform complicated work or giving a feeling of discomfort.

SUMMARY OF THE INVENTION

The image processing apparatus according to the present invention is an image processing apparatus that performs crop processing of an area of a document for image data obtained by a scanner scanning an area including the document, and includes:

a detection unit configured to acquire, by detecting an edge component from a first image obtained by normalizing a signal value from the scanner by using a first white reference value, position information on the document within the first image; and a cropping unit configured to cut out an image area corresponding to the document based on the acquired position information from a second image obtained by normalizing a signal value from the scanner by using a second white reference value, and the first white reference value is higher than the second white reference value.

Further features of the present invention will become apparent from the following description of exemplary embodiments with reference to the attached drawings.

BRIEF DESCRIPTION OF THE DRAWINGS

FIG. 7 is a diagram showing a state where a plurality of documents is placed on a document table;

FIG. 8 is a diagram showing results of luminance gain adjustment at the time of a dark read scan;

FIG. 9 is a diagram showing results of luminance gain adjustment at the time of a normal scan;

FIG. 13 is a diagram showing the way the image area of each document cut out from a scanned image is displayed on a touch panel.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<System Configuration>

Figure 1:
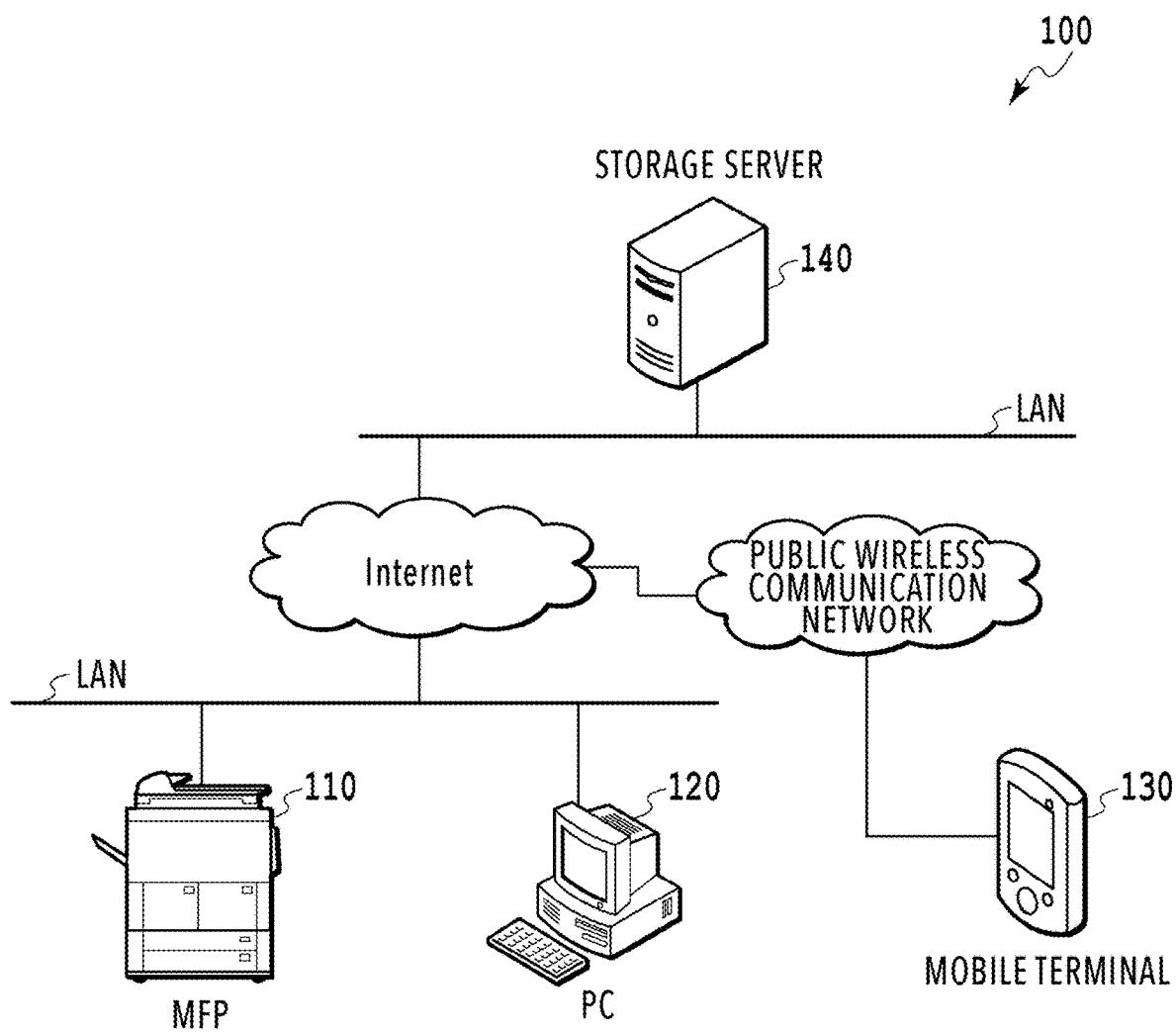
FIG. 1 is a diagram showing an entire configuration of an image processing system.

FIG. 1 is a diagram showing an entire configuration of an image processing system 100. The image processing system 100 includes an MFP (Multi Function Peripheral) 110 having a scan function, a PC 120, a mobile terminal 130, and a storage server 140. Then, each device is connected to a LAN or a public wireless communication network and further the LAN and the public wireless communication network are connected to the Internet. By the network such as this, each device is capable of communication with one another.

The MFP 110 is an image processing apparatus including a scanner mechanism and a printer mechanism, a so-called multi function peripheral. The MFP 110 of the present embodiment is made use of as a scan terminal of a document whose size is smaller than a general document (for example, name card, driver's license, postcard, receipt, and the like). Because of this, the MFP 110 has a multi-crop function to generate an image in units of documents by cutting out an image area corresponding to a document from an image (scanned image) read by scanning one or more documents. By making use of the multi-crop function, in a case where a user desires to obtain image data of a plurality of name cards, receipts, and the like, it is possible to obtain image data of each document without the need to place and scan the documents one by one on a document table. In the following, an image in units of documents generated by the multi-crop function is called a "crop image". It is possible for the MFP 110 to save data of a scanned image or a crop image in an internal storage (BOX saving function), to transmit the data to the PC 120, the mobile terminal 130, and the storage server 140 (SEND function), and so on.

The PC 120 and the mobile terminal 130 are image processing apparatuses that display a scanned image or a crop image received from the MFP 110. Further, it is possible for the PC 120 and the mobile terminal 130 to save and manage a scanned image and a crop image generated by the MFP 100 by using a predetermined application and to perform OCU processing for the saved image. It may also be possible install an application for implementing the above-described multi-crop function in the PC 120 and the mobile terminal 130 and to obtain a crop image by performing multi-crop processing for the scanned image received from the MFP 110 in these devices.

The above-described system configuration is merely exemplary and it is not meant that all the components are necessary for embodying the present embodiment.

<Hardware Configuration of MFP>

Figure 2:
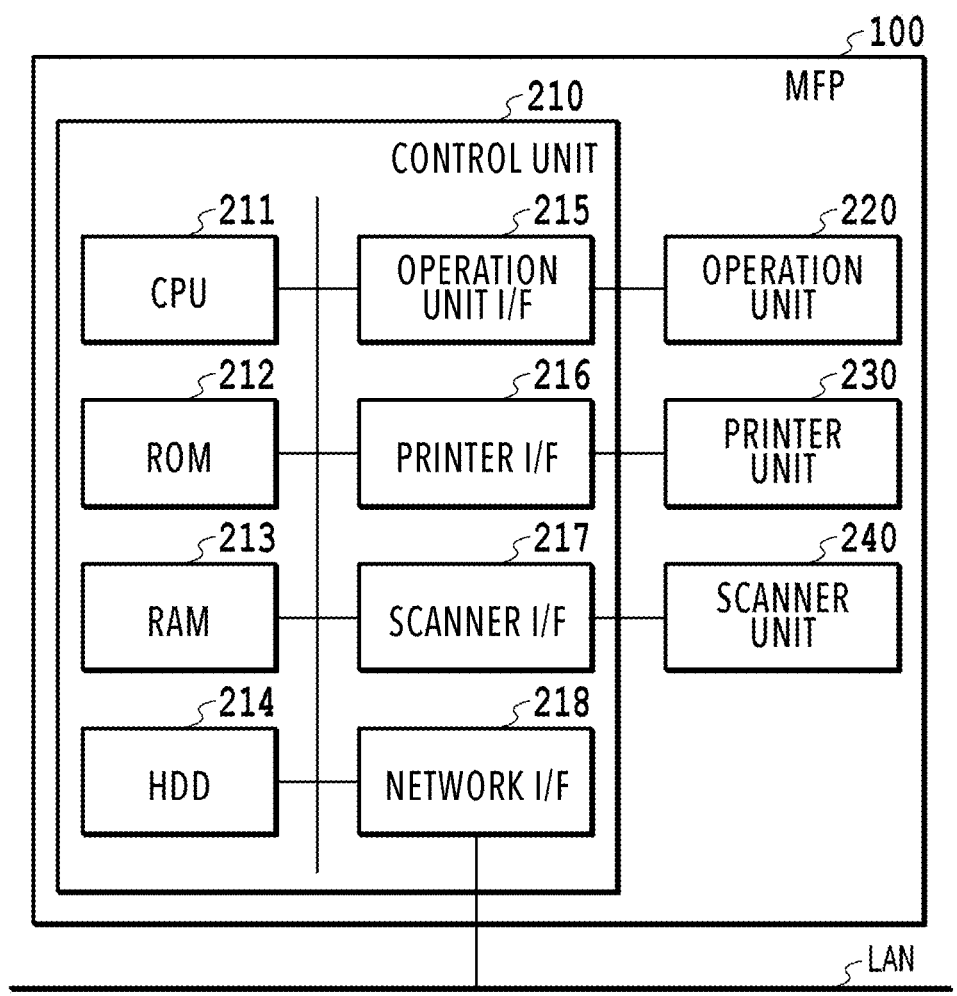
FIG. 2 is a block diagram showing a hardware configuration of an MFP.

FIG. 2 is a block diagram showing a hardware configuration of the MFP 110. The MFP 110 includes a control unit 210, an operation unit 220, a printer unit 230, and a scanner unit 240. The control unit 210 further includes each of units 211 to 218 below and controls the operation of the entire MFP 110. The CPU 211 reads a control program stored in the ROM 212 and performs and controls various functions including the above-described multi-crop function. The RAM 213 is used as a temporary storage area, such as a main memory and a work area, of the CPU 211. The HDD 214 is a large-capacity storage unit storing image data and various programs. The operation unit I/F 215 is an interface that connects the operation unit 220 and the control unit 210. The operation unit 220 includes a touch panel and a hard key and receives the operation/input/instructions by a user. The printer I/F 216 is an interface that connects the printer unit 230 and the control unit 210. Print image data is transferred from the control unit 210 to the printer unit 230 via the printer I/F 216 and printed on a printing medium, such as paper. The scanner I/F 217 is an interface that connects the scanner unit 240 and the control unit 210. The scanner unit 240 inputs an image obtained by scanning a document set on a document table or an ADF (Auto Document Feeder), not shown schematically, to the control unit 210 via the scanner I/F 217. It is possible for the scanned image generated in the scanner unit 240 or the above-described crop image to be printed in the printer unit 230 (copied and output), saved in the HDD 214, transmitted to an external device via a LAN, and so on. The network IF 218 is an interface that connects the control unit 210 (MFP 110) to a LAN. The MFP 210 transmits image data to the PC 120, the mobile terminal 130, and the storage server 140, receives various kinds of information, and so on by using the network I/F 218. The hardware configuration of the MFP 110 explained above is an example and it may also be possible for the hardware configuration to include another configuration as needed, or not to have part of the configurations.

<Generation and Saving of Crop Image>

Figure 3:
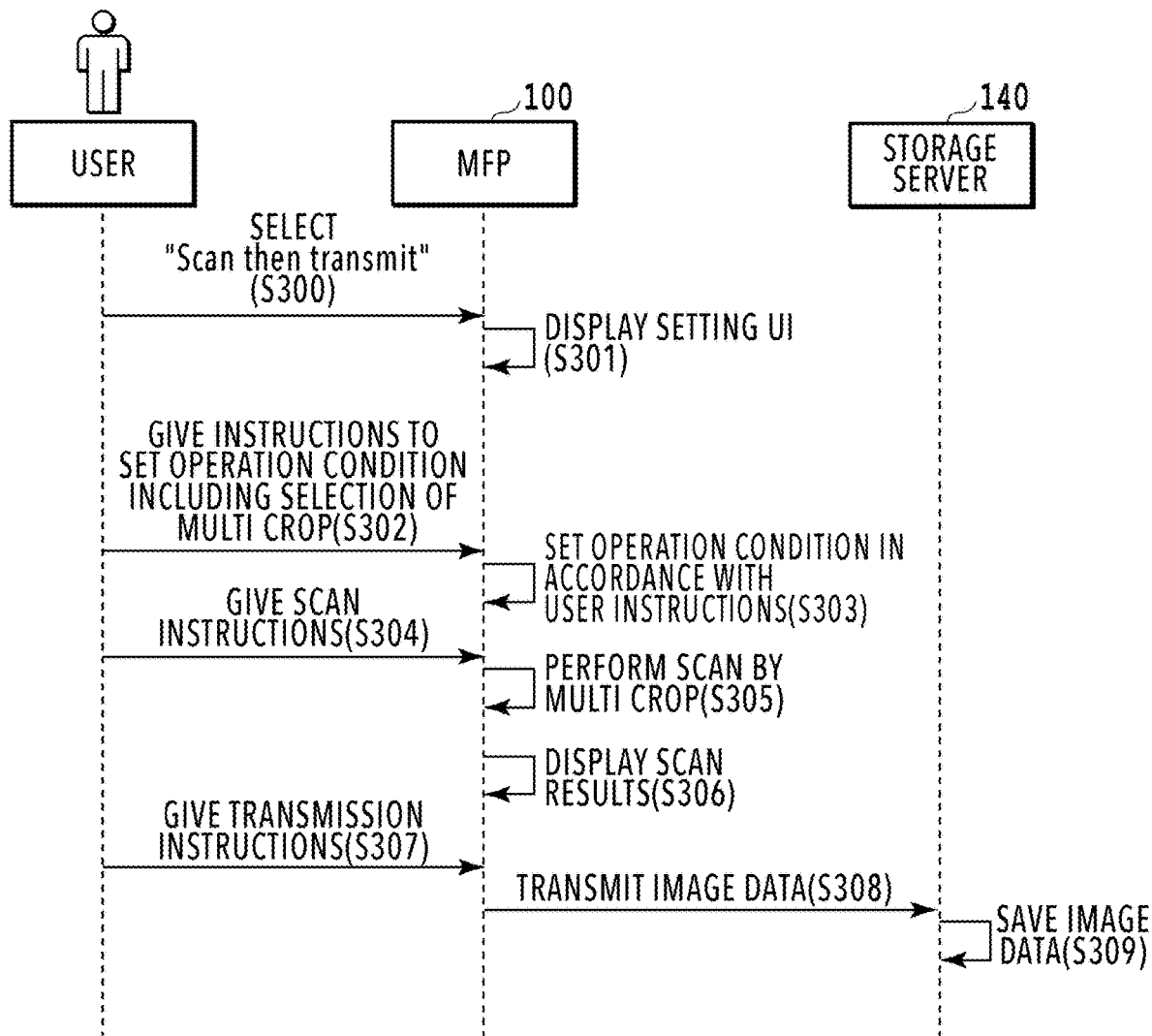
FIG. 3 is a sequence diagram of a use case making use of a multi-crop function.

Next, by taking a use case as an example where a user transmits a crop image obtained by making use of the multi-crop function of the MFP 110 to the storage server 140 and saves the crop image therein in the image processing system 100, the series of flow thereof is explained with reference to the sequence diagram in FIG. 3. In the following explanation, symbol "S" represents a step.

Figure 4A:
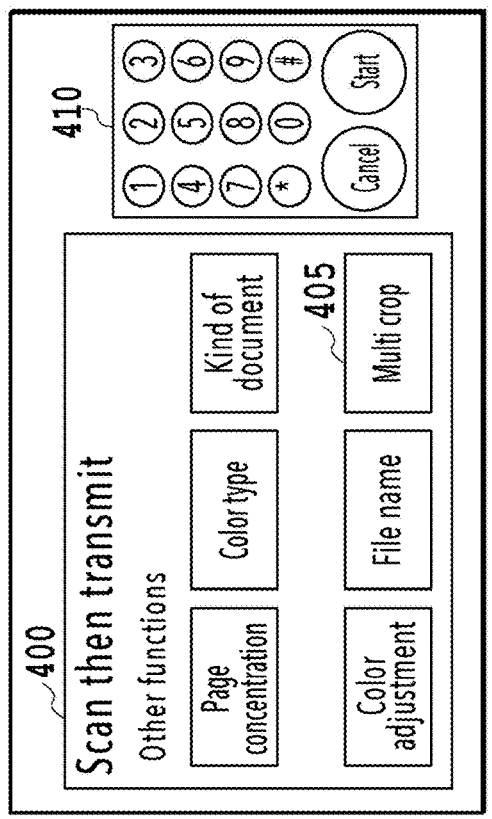
FIG. 4A to FIG. 4D are diagrams showing an example of a UI screen.

First, a user selects a "Scan then transmit" function via the operation unit 220 of the MFP 110 (S300). The "Scan then transmit" function is a function to transmit data of an image obtained by scanning a document by the scanner unit 240 to an external device after performing predetermined image processing and format conversion. FIG. 4A is a diagram showing an external appearance of the operation unit 220 and on the left side, a touch panel 400 that displays a UI screen exists and on the right side, a hard key 410 including a ten key, a Start button, and the like exists. Here, on the touch panel 400, a Main menu screen is displayed and in this state, a user performs a tap operation on a "Scan then transmit" button 401.

Figure 4B:
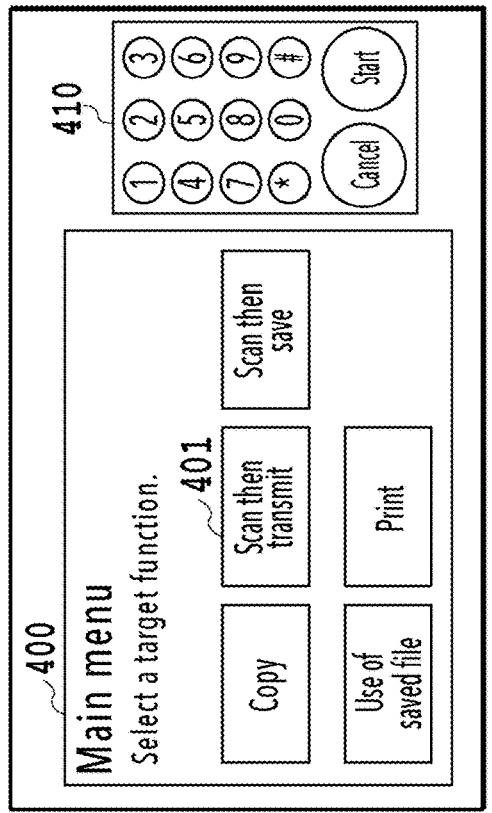
Figure 4C:
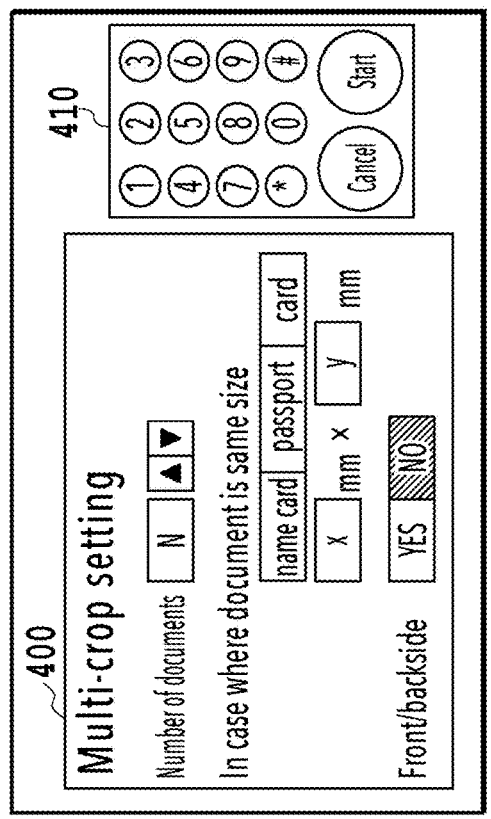
Figure 4D:
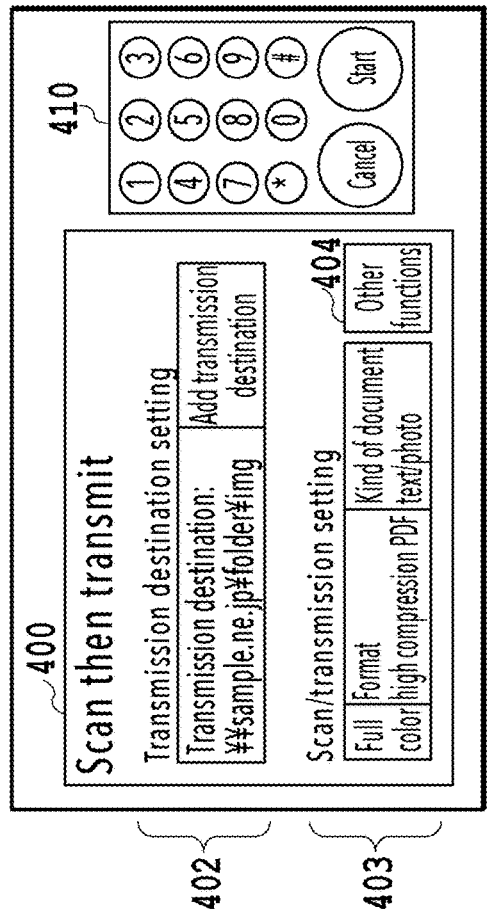

In response to the above-described tap operation, the MFP 110 displays a UI screen for performing various kinds of setting to perform the "Scan then transmit" function on the touch panel 400 (S301). FIG. 4B shows a state where a UI screen for the basic setting of "Scan then transmit" is displayed on the touch panel 400. On the UI screen shown in FIG. 4B, a Transmission destination setting field 402 and a Scan/transmission setting field 403 exist. In the Transmission destination setting field 402, an IP address or the like of an external device (here storage server 140) that is the transmission destination of a scanned image is displayed. In the Scan/transmission setting field 403, in addition to buttons to make selection of a color mode at the time of a scan, selection of an image format, selection of the kind of document, and the like, an "Other functions" button 404 for performing setting of a special use including multi crop exists. In a case where a user selects the "Other functions" button 404 by performing the tap operation, the screen makes a transition into a UI screen for special use setting shown in FIG. 4C. On the UI screen shown in FIG. 4C, among a plurality of buttons corresponding to special uses, a "Multi crop" button 405 exists. In a case where the "multi crop" button 405 is selected, a UI screen for detailed setting of multi crop shown in FIG. 4D is displayed on the touch panel 400. A user gives setting instructions of a variety of operation conditions at the time of performing the "Scan then transmit" function (S302). In the present embodiment, selection of multi crop is included in the setting instructions at this time.

Upon receipt of the setting instructions of operation conditions including selection of multi crop, the MFP 110 stores the operation conditions necessary at the time of performing the "Scan then transmit" function in the RAM 213 as setting values (S303). Then, in a case where a user presses down the Start button within the hard key 410 to give instructions to perform a scan (S304), in response to the instructions, the MFP 110 starts execution of scan processing by the multi-crop function (S305). Then, in a case where the scan processing by the multi-crop function is completed, the MFP 110 displays the results on the touch panel 400 (S306). A user having checked images (crop images) in units of documents obtained by multi crop gives instructions to transmit data of each crop image to a predetermined transmission destination (here, storage server 140) by performing an operation, such as pressing down again the Start button (S307). Upon receipt of the transmission instructions of a user, the MFP 110 transmits the data of the crop image to the storage server 140 (S308). Then, the storage server 140 saves the data of the crop image received from the MFP 110 (S309). At this time, for example, it may also be possible to perform OCR processing for each crop image and to save the data of each crop image by associating obtained character recognition results with each crop image as additional information. Due to this, it is possible for a user to search for an image corresponding to a desired document by using an arbitrary character string. The image data saved in the storage server 140 in this manner is output to the PC 120, the mobile terminal 130, and the like in accordance with browse instructions from a user.

The above is the series of flow until the crop image obtained by making use of the multi-crop function is transmitted to the storage server 140 and saved therein.

<The Way of Thinking of Multi Crop in the Present Embodiment>

In the present embodiment, in a case where the multi-crop function is set to on, the luminance gain of a scanned image for document edge detection is adjusted so that the image becomes an image darker than a scanned image for transmission/saving. The reason is explained.

Figure 5A:
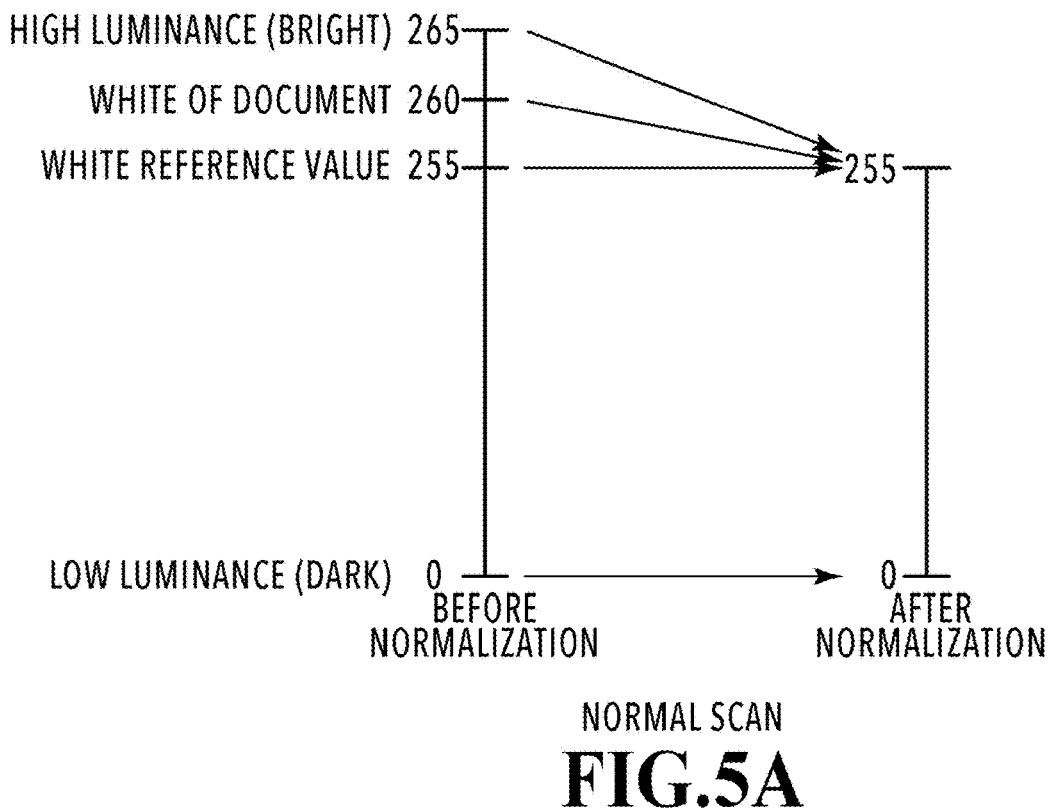
FIG. 5A is a diagram explaining luminance gain adjustment at the time of a normal scan and FIG. 5B is a diagram explaining luminance gain adjustment at the time of a dark read scan.

In a scanned image that is acquired by a normal scan (=multi-crop function is set to off), white objects, such as a white plate of a document table cover and a paper white portion, will all have the same signal value by luminance gain adjustment. Here, the luminance gain adjustment is processing to adjust the brightness of an image by normalizing the signal value (luminance value) representing the luminance component of a scanned image based on the white reference value. FIG. 5A is a diagram explaining the luminance gain adjustment at the time of a normal scan. In FIG. 5A, the left side represents the luminance value before normalization and the right side represents the luminance value after normalization. Here, it is assumed that the luminance value in a case where the white reference plate provided in the MFP 110 is scanned is "255", the luminance value in a case where the paper white portion of a document is scanned is "260", and the maximum luminance value in a case where the brightest portion of the document is scanned is "265". At this time, the gain adjustment parameter (gain that is the target of the white reference value) is set to "255". In this case, all the signal values of the luminance higher than the white reference value become "255". That is, as a result of the gain adjustment, the luminance values of all the highlight portions having a luminance value higher than or equal to "255" are converted to "255". Because of this, the luminance values of all the portions, that is, the portion at which the white reference plate is scanned, the portion of the paper white portion of the document, and the brightest portion of the document, become 255. As a result of this, it is no longer possible to recognize the boundary between the white plate of the document table cover and the paper whiter portion of the document (it is no longer possible to detect the edge of the document). Consequently, in the present embodiment, in a case where the edge of the document is detected, the above-described gain adjustment parameter is set to a value higher than that at the time of a normal scan and an image that is dark on the whole in which the signal values of the highlight portions keep being values still representing highlight portions is used. Due to this, the boundary between the white plate of the document table cover and the paper white portion of the document becomes clear, and therefore, it is made possible to easily extract the edge of the document and to appropriately cut out the image area corresponding to each document.

<Scan Processing at the Time of Using Multi-Crop Function>

Figure 5B:
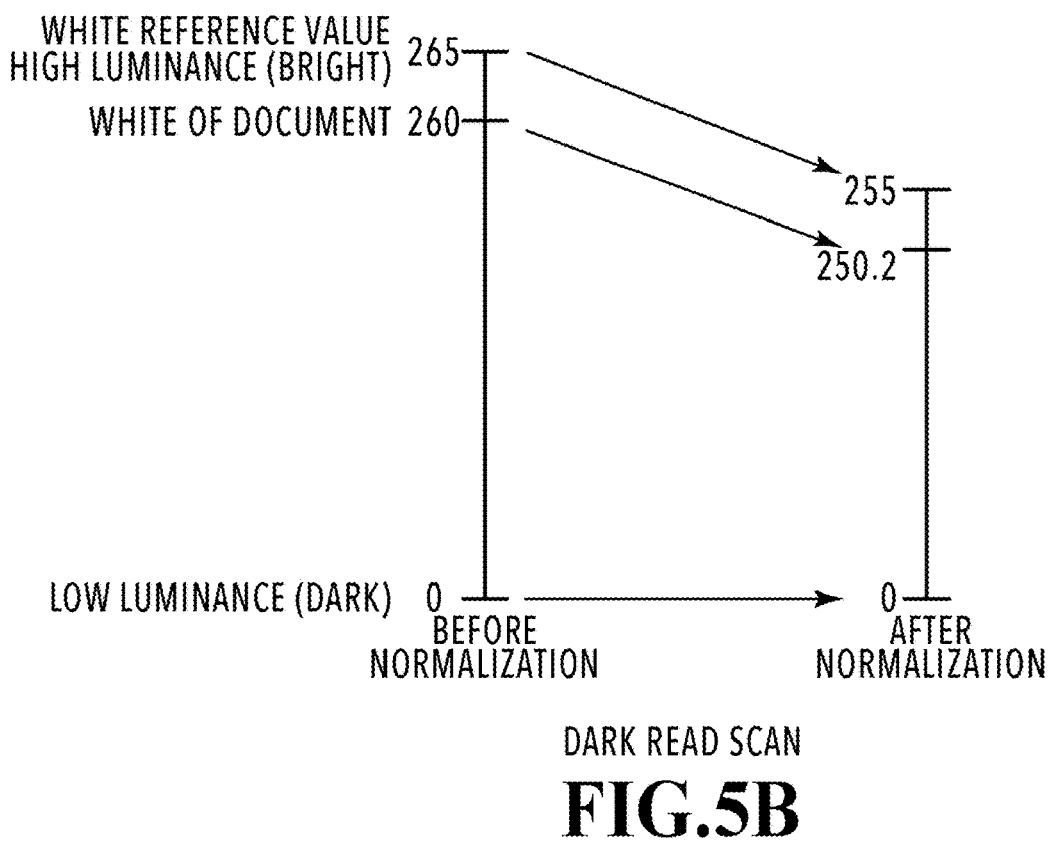

Following the above, the scan processing (S305) by the multi-crop function according to the present embodiment is explained. In a case of the present embodiment, the scan processing is performed in units of lines and for the scan results, the image processing including the luminance gain adjustment is performed separately for document edge detection and for saving/transmission. That is, the scan processing in units of lines and the image processing including the luminance gain adjustment for the scan results are performed separately twice for obtaining an image that is dark on the whole and for obtaining an image whose brightness is normal. Hereinafter, the scan for acquiring a dark image for document edge detection is called a "dark read scan". FIG. 5B is a diagram explaining the luminance gain adjustment at the time of a dark read scan. In this example, the gain adjustment parameter is set to "265" obtained by adding 10 to "255" at the time of a normal scan. Due to this, the luminance value "265" of the brightest portion of the document is converted to "255" and the luminance value "260" of the paper white portion of the document is converted to "250.2", respectively, and it is known that a difference significant for edge detection is obtained in the highlight area.

Figure 6:
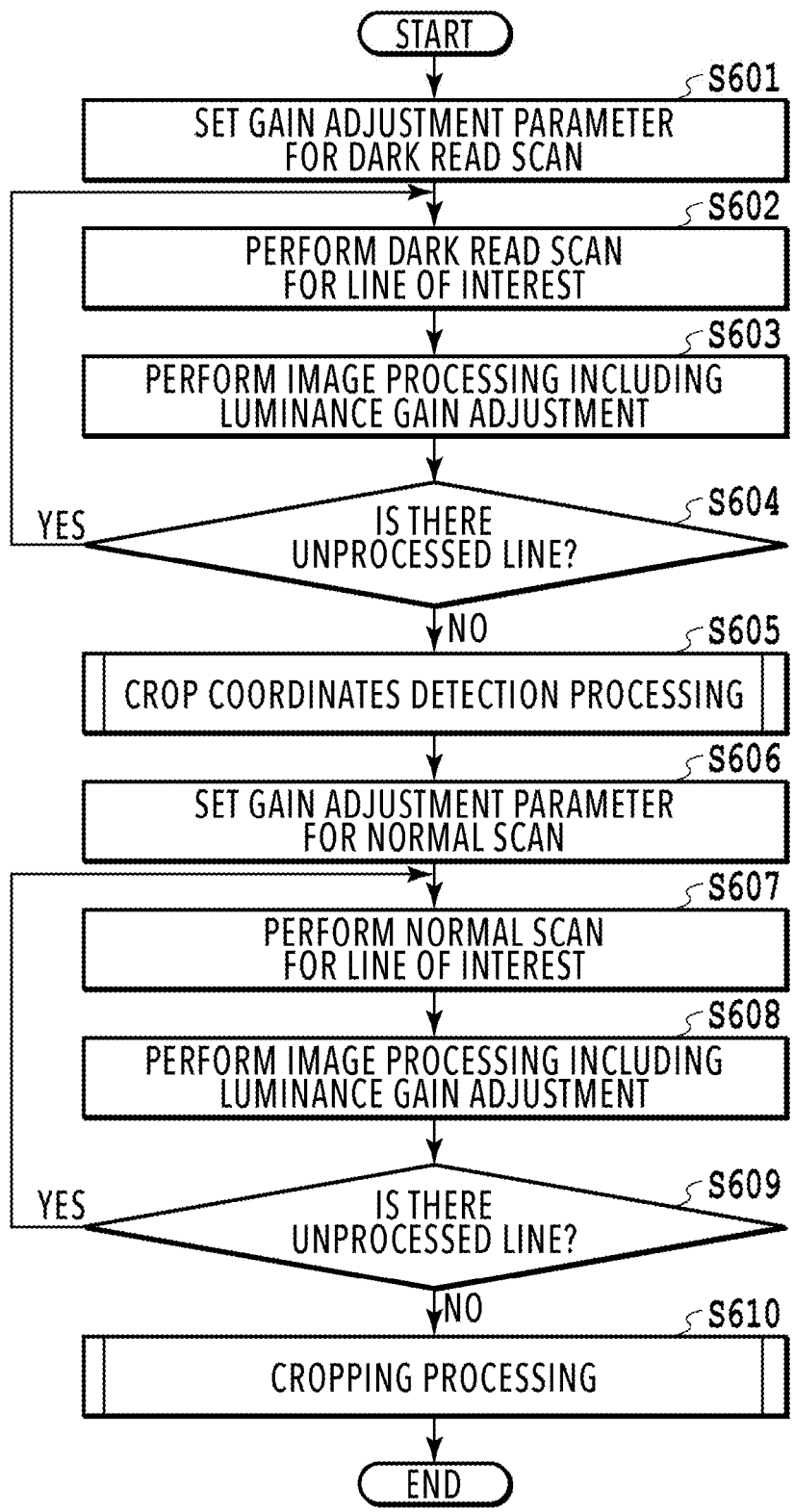
FIG. 6 is a flowchart showing a flow of scan processing by multi crop.

FIG. 6 is a flowchart showing a flow of the scan processing by multi crop according to the present embodiment. It is assumed that this flow is implemented by the CPU 211 loading a program stored in the ROM 212 or the HDD 214 onto the RAM 213 and executing the program.

At S601, the gain adjustment parameter for the dark read scan, which is the first scan, is set. Specifically, the value (in the example described above, "265") determined in advance for the dark read scan is read from the HDD 119 or the like and set to the RAM 213 as the gain adjustment parameter at the time of the dark read scan.

Figure 7:
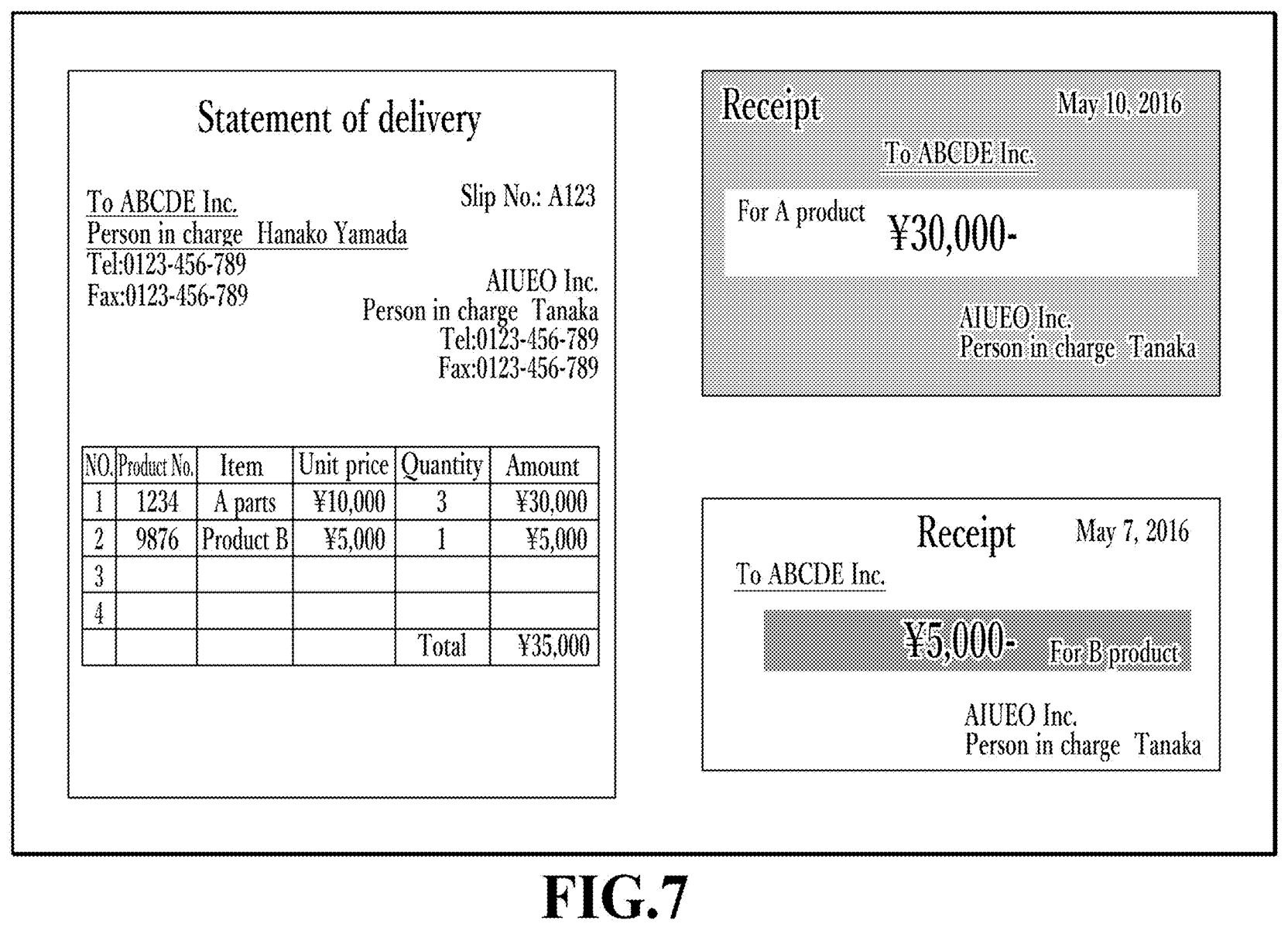

At S602, in the scanner unit 240, the dark read scan to read one or more documents placed on the document table is performed in units of lines. In this case, the scan-target line is called a "line of interest". FIG. 7 is a diagram showing the state where a plurality of documents is placed on the document table. Here, on the glass surface of the document table, a total of three documents, that is, one statement of delivery of the standard size (A4) and two receipts of nonstandard sizes are placed. In this state, the dark read scan is performed in units of lines.

At S603, for the image corresponding to one line acquired by the dark read scan at S602, the predetermined image processing including the luminance gain adjustment described previously is performed. The image processing other than the luminance gain adjustment includes conversion into an image in the bitmap format, shading correction for the image after conversion, and the like. Then, the luminance gain adjustment is performed for the image for which the shading correction has been performed. In the luminance gain adjustment, first, a luminance value d of each pixel of the scanned image corresponding to one line is modified by using the gain adjustment parameter set at S601. Here, a luminance value d' after the modification, which is represented by eight bits, is found by, for example, equation (1) below.

$$d' = d \times 255 / \text{gain adjustment parameter} \quad \text{equation (1)}$$

In equation (1) described above, the luminance value d before the modification is found by equation (2) below from the RGB values of each pixel in a scanned image.

$$d = 0.299 \times R \text{ value} + 0.587 \times G \text{ value} + 0.114 \times B \text{ value} \quad \text{equation (2)}$$

Then, the luminance value after the modification that is found as described above is converted so that the luminance value is included within a predetermined range by performing processing to exchange the luminance value with a predetermined luminance value as needed. Specifically, in a case where the luminance value after the modification is smaller than or equal to "0", the luminance value is converted into "0" and in a case where the luminance value after the modification is larger than or equal to "255", the luminance value is converted into "255". The value thus obtained is the luminance value after the gain adjustment. In this manner, a scanned image corresponding to one line is acquired, whose signal value on the high luminance side is kept and which is darker than that in the standard state. Further, for the image after the luminance gain adjustment, image quality adjustment processing, such as adjustment of color balance, background removal, and adjustment of sharpness and contrast, is performed as needed.

Figure 8:
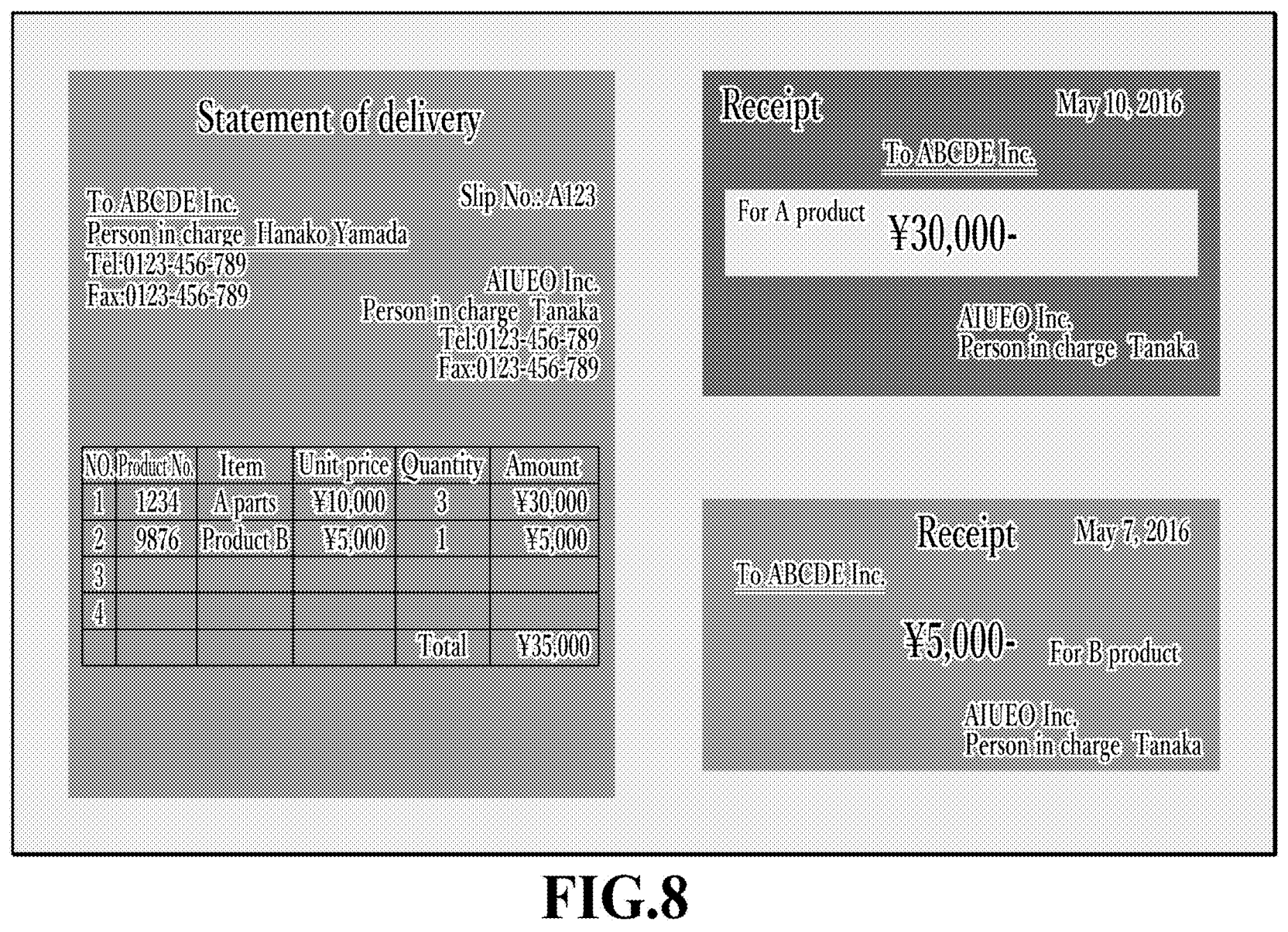

At S604, whether the dark read scan of all the lines is completed is determined. In a case where there is an unprocessed line, the processing returns to S602 and processing for the next line of interest is continued. On the other hand, in a case where the dark read scan of all the lines is completed, the processing advances to S605. FIG. 8 shows results obtained by performing the luminance gain adjustment for the dark read scan for the three documents shown in FIG. 7. FIG. 9 shows results obtained by performing the luminance gain adjustment for the normal scan as a comparison. It is known that in the processing results in FIG. 8, the image is dark on the whole compared to the processing results in FIG. 9 and the contrast between the image area of each document and the background is clear. The data of the scanned image after the luminance gain adjustment thus obtained is temporarily stored in the RAM 213 or the HDD 214.

At S605, processing to detect crop coordinates is performed. Here, the crop coordinates are the coordinates of the four vertexes of the image area corresponding to each document existing within the scanned image and play a role as document position information. Details of the crop coordinates detection processing will be described later.

At S606, the gain adjustment parameter for the scan for saving/transmission, which is the second scan, is set. Specifically, the value (in the example described above, "255") determined in advance for the normal scan is read from the HDD 214 or the like and set to the RAM 213 as the gain adjustment parameter. Then, at S607, in the scanner unit 240, the normal scan for reading one or more documents placed on the document table is performed in units of lines. That is, the second scan is performed in the state after the dark read scan has been performed and being kept as it is. Then, at S608, the predetermined image processing including the luminance gain adjustment as in the case with S603 is performed for the scanned image corresponding to one line acquired by the normal scan.

At S609, whether the normal scan of all the lines is completed is determined. In a case where there is an unprocessed line, the processing returns to S607 and the processing for the next line of interest is continued. On the other hand, in a case where the normal scan of all the lines is completed, the processing advances to S610. The data of the obtained scanned image after the luminance gain adjustment is stored temporarily in the RAM 213 or the HDD 214.

At S610, processing (image cropping processing) to cut out the image area corresponding to each document placed on the document table from the scanned image for which the luminance gain adjustment for the normal scan has been performed is performed. At this time, the image area corresponding to each document is cut out in accordance with the crop coordinates (coordinates of four vertexes of each document) detected at S605. Details of the cropping processing will be described later.

The above is the contents of the scan processing by multi crop according to the present embodiment. Then, the data of the crop image of each document cut out from the scanned image for saving/transmission is stored in the RAM 213 or the HDD 214 after being subjected appropriately to compression processing or the like and transmitted to the storage server 140 or the like based on user instructions thereafter.

<Crop Coordinates Detection Processing>

Figure 10:
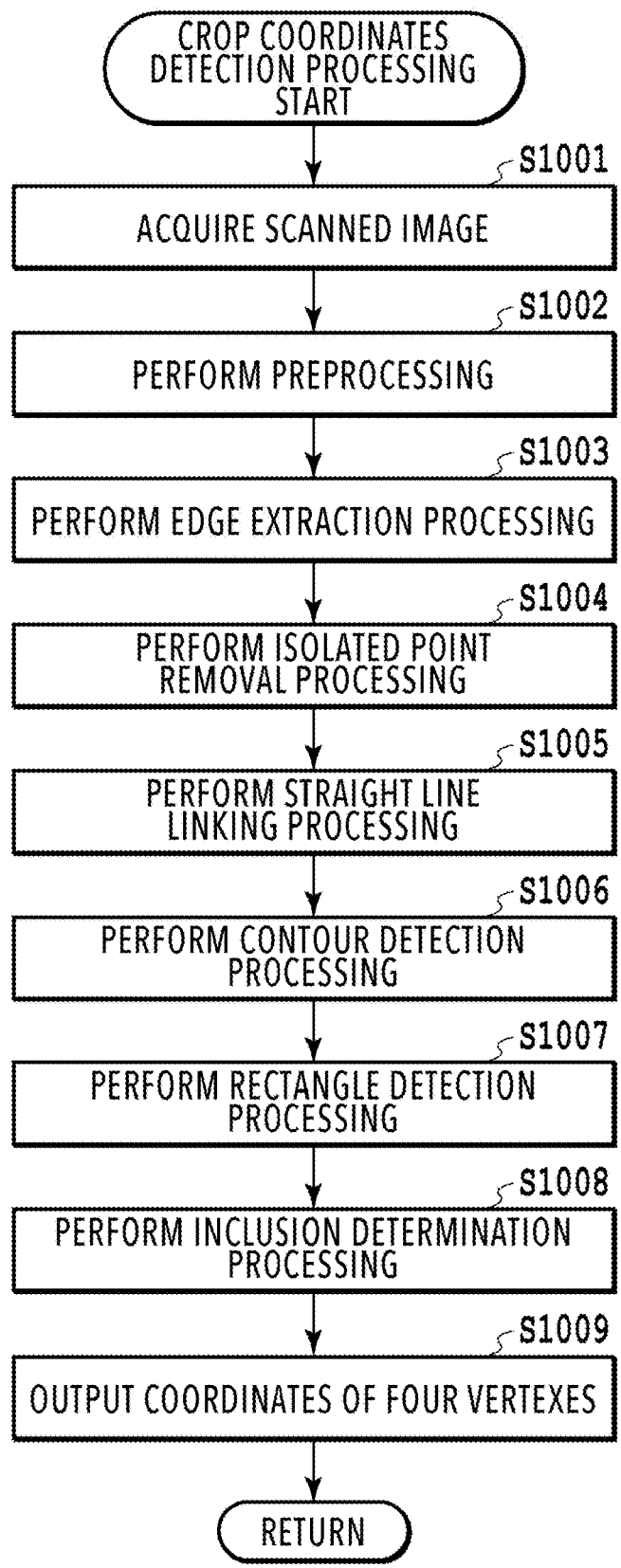
FIG. 10 is a flowchart showing details of crop coordinates detection processing.

Next, the crop coordinates detection processing (S605) is explained in detail. FIG. 10 is a flowchart showing details of the crop coordinates detection processing. In the following, explanation is given along the flow in FIG. 10.

At S1001, as a processing-target image, the data of the scanned image dark on the whole acquired by the dark read scan (S602) and then for which the luminance gain adjustment has been performed (S603) is read and acquired from the RAM 213 or the HDD 214. At this time, in a case where the image is compressed into the JPEG format or the like, the image is decompressed into the original image size and then acquired. Here, explanation is advanced on the consumption that the scanned image as shown in FIG. 8 described previously is acquired.

At S1002, preprocessing to convert an image into one suitable to each piece of processing at S1003 and the steps that follow is performed for the scanned image acquired at S1001. As the contents of the preprocessing, mention is made of, for example, graying (monochromatization) conversion processing to reduce the number of channels by converting an image including three channels of RGB into an image including one channel of gray, and resolution reduction processing to convert an image with a resolution of 600 dpi into an image with a resolution of 150 dpi. By this preprocessing, it is possible to reduce the processing load at each step that follows by reducing the image data size and to implement high-speed processing. This preprocessing is processing whose purpose is to reduce the processing load, and therefore, in a case where there are sufficient image processing resources, this preprocessing may be omitted.

At S1003, an edge component is extracted from the scanned image for which the preprocessing has been performed. For the extraction of an edge component, it may also be possible to apply a publicly known method, for example, such as the Sobel method of estimating the gradient of the luminance of an image, the Prewitt method, the Roberts cross method, and the Canny method that takes into consideration the continuity thereof. Further, it may also be possible to perform the AND operation for the results obtained by using a plurality of methods. The result thus obtained by the edge extraction processing (hereinafter, called "edge image") is stored in the RAM 213.

At S1004, for the edge image, processing to remove isolated points (isolated point removal processing) is performed. In the edge image, edge components corresponding trash and scars on the document table may be included and by this isolated point removal processing, the isolated points (aggregate of black pixels, smaller than a predetermined size), which are edge components other than the edges of the document, are removed.

Figure 11A:
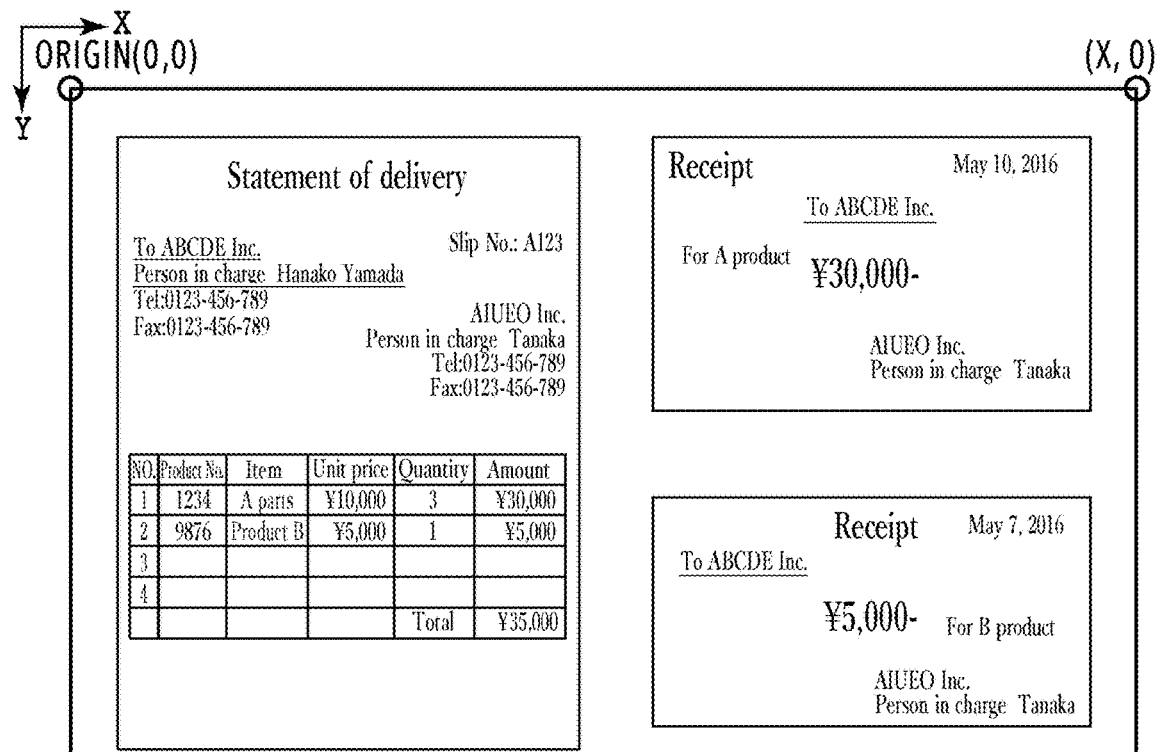
FIG. 11A is a diagram showing an edge image after performing straight line linking processing and FIG. 11B is a diagram showing coordinates of four vertexes of each document detected from the edge image.

At S1005, for the edge image from which isolated points are removed, straight line linking processing is performed. The straight line linking processing is processing to link portions between which pixels (edge pixels) are not continuous in the edge image after isolated points are removed. For example, in a case where the edge extraction processing is performed for an image in which the gradient of the luminance is uneven, sometimes the line of the extracted edge is not continuous. Consequently, the segments of the edges, which are not continuous, are linked by a publicly known method, such as Hough transform. Due to this, an edge image in which the edge of each document is represented by a continuous segment is obtained. FIG. 11A shows an edge image after the straight line linking processing is performed.

At S1006, for the edge image for which the straight line linking processing is performed, processing to detect contours is performed. By this contour detection processing, coordinates of the vertexes of the contour lines linking the edge pixels included in the edge image are found.

At S1007, by using the coordinates of the vertexes acquired by the contour detection processing, processing to detect a rectangle from the edge image is performed. Specifically, a circumscribed rectangle of the area surrounded by the four or more vertexes is detected and a rectangular object surrounded by the contour line is extracted.

At S1008, for each rectangle detected by the rectangle detection processing, processing (inclusion determination processing) to determine whether or not there is a rectangle included inside thereof is performed. Specifically, a rectangle of interest is selected from the detected rectangle and whether or not there is another rectangle included inside the rectangle of interest is determined. Then, the rectangle located on the outermost side is specified as an effective rectangle corresponding to the edge of the document. By this inclusion determination processing, rectangles are classified into effective rectangles representing a paper chip of each document and ineffective rectangles representing a chart and the like located within the document.

Figure 11B:
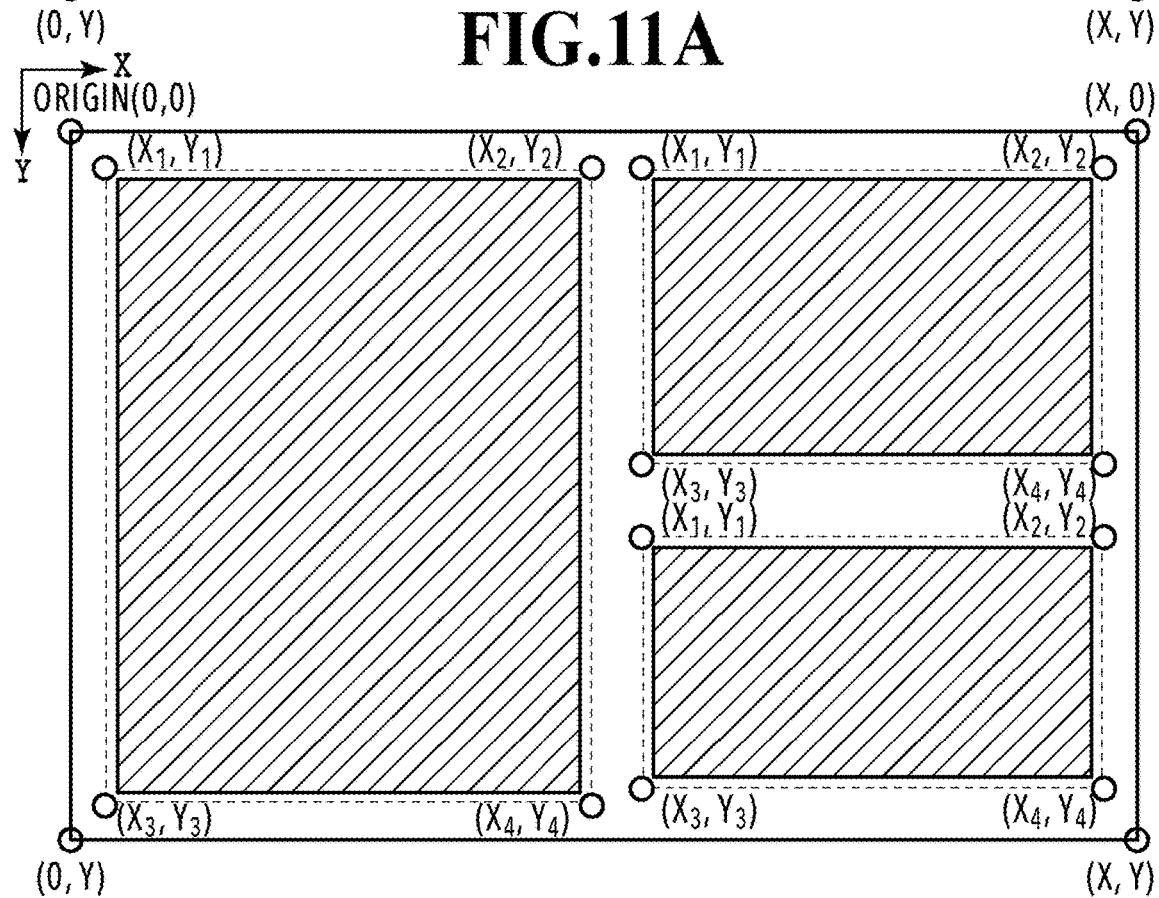

At S1009, the coordinates of the four vertexes of the rectangle specified as an effective rectangle by the inclusion determination processing are output as crop coordinates. At this time, in a case where the image size reduction processing has been performed in the preprocessing (S1002) described above, processing to convert the coordinate values into the coordinate values in the original image size is also performed. FIG. 11B shows the coordinates of the four vertexes of each document detected from the edge image shown in FIG. 11A. The image area corresponding to each document is specified by the coordinates of the four vertexes with the top left of the scanned image being taken to be the origin (x, y)=(0, 0) and each image area has an area of a width of X pixels and a height of Y pixels. In the example in FIG. 11B, for each of document A corresponding to the statement of delivery and document B and document C corresponding to the receipts, the coordinates of the four vertexes ($\{x_i, y_i\}$ to $\{x_i, y_i\}$, i=1 to 4) are obtained. The data of the output coordinates of the four vertexes (crop coordinates) is stored in the RAM 213 or the HDD 214.

The above is the contents of the crop coordinates detection processing. Here, in the crop coordinates detection processing, the processing of graying conversion and resolution reduction is performed, but the crop coordinates detection processing is not limited to this. For example, it may also be possible to change the scan condition from the beginning so that a scanned image of one channel or with a low resolution is obtained in the dark read scan. Due to this, the preprocessing (S1002) described previously is no longer necessary, and therefore, it is possible to obtain additional effects, such as an increase in the scan speed, an increase in the speed of loading image data in the multi-crop coordinates detection processing, and a reduction in the amount of memory to be used. Further, explanation is given here on the premise that the shape of a document is rectangular, but a document having a shape other than a rectangle is also considered. In such a case, it is sufficient to find the minimum circumscribed rectangle of the document and to detect the coordinates of the four vertexes as crop coordinates. At this time, a background portion other than the document is included in the minimum circumscribed rectangle, but it is sufficient to make the color of the background portion in the cutout crop image the same as that of the paper white portion, and the like.

<Cropping Processing>

Figure 12:
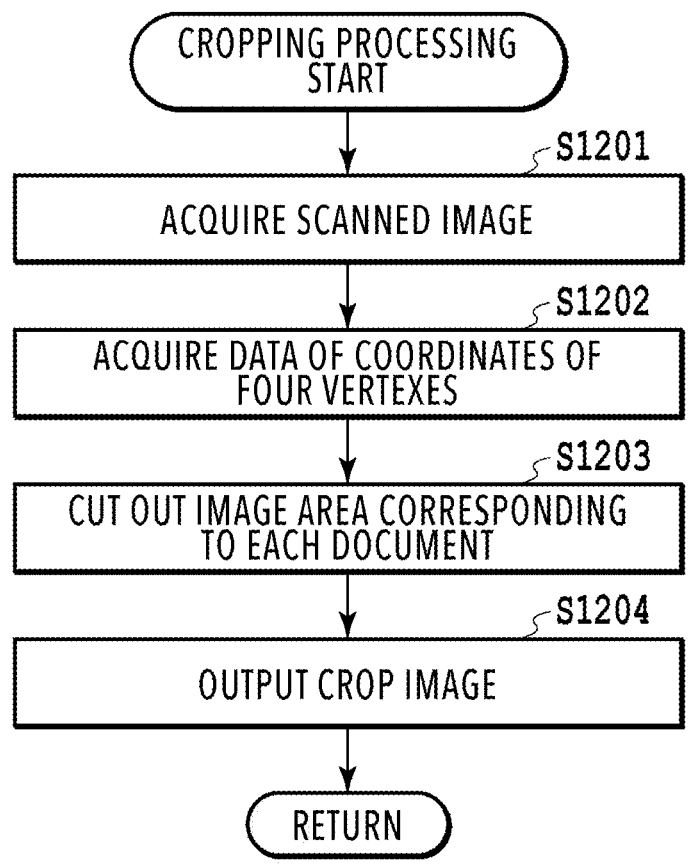
FIG. 12 is a flowchart showing details of cropping processing.

Next, the cropping processing (S610) at the time of performing the "Scan then transmit" function is explained in detail. FIG. 12 is a flowchart showing details of the cropping processing. In the following, explanation is given along the flow in FIG. 12.

At S1201, as the processing-target image, the data of the scanned image acquired by the normal scan and for which the luminance gain adjustment has been performed is read and acquired from the RAM 213 or the HDD 214. At this time, in a case where the image is compressed into the JPEG format or the like, the image is acquired after decompressing the image into the original image size. Here, explanation is advanced on the assumption that the scanned image shown in FIG. 9 described previously is acquired.

At S1202, the data of the coordinates of the four vertexes of the effective rectangle detected by the crop coordinates detection processing (S605) described previously is read and acquired from the RAM 213 or the HDD 214.

At S1203, based on the coordinates of the four vertexes acquired at S1202, the image area corresponding to each document is cut out from the scanned image acquired at S1201. The method of cutting out the image area of each document from the scanned image is not limited in particular and it may be possible to use a publicly known method. For example, in a case where the rectangle specified by the coordinates of the four vertexes is not inclined, the image area obtained by connecting the coordinates of the four vertexes is cut out as it is. In a case where the rectangle specified by the coordinates of the four vertexes is inclined, it is sufficient to cut out an image area that takes into consideration rotation by the affine transform. Further, in a case where the rectangle specified by the coordinates of the four vertexes has distortion, it may also be possible to perform cutout by projection transform using a homography matrix taking into consideration trapezoid correction and distortion correction.

At S1204, images (crop images) in units of documents of one or more documents placed on the document table are output. Specifically, first, the image area of each document cut out at 1203 is displayed on the touch panel 400. FIG. 13 shows the way the results cut out from the scanned image in FIG. 9 are displayed on the touch panel 400. Due to this, a user grasps that each image corresponding to the three documents placed on the document table is obtained. Then, in a case where a user presses down the "Start" button within the hard key 410, data of the image corresponding to each document is transmitted to an IP address or the like specified in the Transmission destination setting field 402.

The above is the contents of the cropping processing at the time of performing the "Scan then transmit" function. Explanation is given by taking the case as an example where the "Scan then transmit" function is performed, but the application range thereof is not limited to this. For example, the processing may be processing specialized in multi crop and it is possible to widely apply to any function that makes use of scan processing, such as a "Scan then save" function to save a scanned image in the HDD 214.

Further, an aspect may be accepted in which data of a scanned image obtained by performing a scan in the MFP 110 is transmitted to the PC 120 or the like and crop coordinates detection processing and cropping processing are performed in the PC 120 or the like.

Modification Example

In the example described above, the image processing including the luminance gain adjustment is performed sequentially for the scanned image acquired in units of lines and the two kinds of scanned image for document edge detection and for saving/transmission are acquired, but this is not limited. For example, it may also be possible to acquire the two kinds of scanned image for document edge detection and saving/transmission by performing a scan for all the lines at a time and separately performing the gain adjustment processing using a different gain adjustment parameter for the obtained scan results corresponding to all the lines.

Further, it may also be possible to generate an image that is dark on the whole and which is suitable to detection of an edge of a document separately from an image suitable to saving or the like by reducing the brightness of a light source at the time of the scan for document edge detection in place of changing the parameter used for luminance gain adjustment. By the method such as this, it is also possible to acquire an image for document edge detection, in which the signal value on the high luminance side is kept. Specifically, in the first scan, an image for edge detection is generated by performing the scan with the reduced amount of light emitted from a light source and crop coordinates are detected from the generated image. The degree of the reduction at this time is, for example, 3 to 5% and it is sufficient to determine the optimum reduction rate in accordance with the brightness of the light source itself and the scan speed. Then, in the second scan, an image for saving/transmission is generated by returning the amount of light emitted from the light source to the normal amount and a crop image is extracted from the generated image. By this method also, it is possible to obtain the same effect.

As above, according to the present embodiment, in the multi-crop function, an image that is dark on the whole and in which it is easy to detect an edge of the document and an image that is bright on the whole and which is suitable to saving or the like are generated separately. Then, by using edge information with a high accuracy detected from the image dark on the whole, the image area corresponding to each document is cut out from the image whose quality is suitable to saving or the like. Due to this, at the time of making use of the multi-crop function, it is possible to obtain a crop image with a high image quality without the troublesome need to cover the document table with a black sheet after placing a document and without giving a feeling of discomfort, such as the glare caused by performing the scan with the document table cover being left open.

Second Embodiment

In a case where the image for document edge detection and the image for saving/transmission are acquired by different scan processing, there is a possibility that a position shift occurs between the image obtained by the first scan and the image obtained by the second scan. Consequently, an aspect in which a position shift between both images is corrected is explained as a second embodiment. In the following, premised on the flow in FIG. 6 of the first embodiment, explanation of the common contents is omitted, and explanation is given to position shift correction, which is a different point.

In the present embodiment, prior to the cropping processing (S610), with the scanned image obtained by the second scan, which is the target, as a reference, processing to determine the presence/absence and the degree of a shift from the scanned image obtained by the first scan, which is the target of the crop coordinates detection processing (S605), is performed. Then, based on the determination results, the coordinates of the four vertexes of each document detected by the crop coordinates detection processing are corrected and the cropping processing is performed by using the coordinates of the four vertexes after the correction.

First, in the position shift determination, for example, processing to estimate the position shift amount in the horizontal direction between the image acquired by the first scan and the image acquired by the second scan is performed. At this time, it may also be possible to perform estimation taking only translation into consideration and to perform estimation further taking rotation into consideration. As one of methods of estimating a shift amount from a reference image, there is a method of estimating the position shift amount from the shift amount in a case where similarity becomes the highest by calculating the similarity while shifting the pixel within an image. Further, this method also includes a variety of kinds. For example, the SSD (Sum of Squared Difference) method uses the sum of squared differences in the luminance value of a pixel at the same position. The smaller the value obtained by using equation (3) below is, the higher the similarity is meant.

$$SSD = \sum_{j=0}^{n-1} \sum_{i=0}^{m-1} (S(i, j) - M(i, j))^2 \quad \text{equation (3)}$$

In equation (3) described above, M (i, j) indicates the luminance value of a reference image and S (i, j) indicates the luminance value of an image for which the shift amount is to be estimated. Further, (i, j) indicates the pixel position (coordinates) in a case where the number of pixels in the X-axis (horizontal) direction of the image is taken to be m and the number of pixels in the Y-axis (vertical) direction is taken to be n.

In addition to this, mention is made of the SAD (Sum of Absolute Difference) method using the sum of absolute values of the difference in the luminance value of a pixel at the same position and the NCC (Normalized Cross-Correlation) method.

In the SAD method, the smaller the value obtained by using equation (4) below is, the higher the similarity is meant.

$$SAD = \sum_{j=0}^{n-1} \sum_{i=0}^{m-1} |S(i, j) - M(i, j)| \qquad \text{equation (4)}$$

In the NCC method, the closer the value obtained by using equation (5) below is to 1, the higher the similarity is meant.

$$NCC = \frac{\sum_{j=0}^{n-1} \sum_{i=0}^{m-1} S(i, j) \cdot M(i, j)}{\sqrt{\sum_{j=0}^{n-1} \sum_{i=0}^{m-1} S(i, j)^2 \times \sum_{j=0}^{n-1} \sum_{i=0}^{m-1} M(i, j)^2}} \qquad \text{equation (5)}$$

Then, based on the shift amount in units of pixels obtained as described above, the coordinates of the four vertexes of each document detected by the crop coordinates detection processing are corrected so that the position shift is supressed. Due to this, even in a case where a position shift occurs between two images obtained by different scans, it is possible to accurately cut out a crop image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to cut out the image area corresponding to a document with a high accuracy from an image obtained by scanning the document without forcing a user to perform complicated work or without giving a feeling of discomfort.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-100331, filed May 25, 2018 which is hereby incorporated by reference wherein in its entirety.

What is claimed is:

1. An image processing apparatus that performs crop processing for image data obtained by a scanner scanning a document, the apparatus comprising:
at least one memory that stores a program; and
at least one processor that executes the program to:
detect an edge component of the document from a first image to acquire position information of the document within the first image, wherein the first image is obtained by normalizing a signal value output from the scanner by using a first white reference value; and
crop, based on the acquired position information of the document, a document image corresponding to the document from a second image, wherein the second image is obtained by normalizing a signal value output from the scanner by using a second white reference value,
wherein the first white reference value is higher than the second white reference value.

2. The image processing apparatus according to claim 1, further comprising:
a document table for placing the document; and
the scanner that scans a document placed on the document table,
the at least one processor controls the scanner to scan a document placed on the document table and generates the first image by using the first white reference value and the second image by using the second white reference value.

3. The image processing apparatus according to claim 1, wherein
the first white reference value is a value higher than a signal value obtained by scanning a white reference plate.

4. The image processing apparatus according to claim 2, wherein
the at least one processor controls the scanner to perform a scan for generating the first image and a scan for generating the second image separately from each other.

5. The image processing apparatus according to claim 1, wherein
the at least one processor further performs resolution reduction processing for the first image, and wherein the edge component of the document is detected from the first image whose resolution is reduced, and wherein the position information of the document within the first image is acquired based on the detected edge component.

6. The image processing apparatus according to claim 1, wherein the at least one processor further performs graying conversion processing to convert the first image into the image of one channel, and wherein the edge component of the document is detected from the first image which is converted into the image of one channel, and wherein the position information of the document within the first image is acquired based on the detected edge component.

7. The image processing apparatus according to claim 1, wherein the at least one processor further performs graying conversion processing to convert the first image into the image of one channel and resolution reduction processing to convert the first image into an image with a low resolution, and wherein the edge component of the document is detected from the first image which is converted into the image of one channel and whose resolution is reduced.

8. The image processing apparatus according to claim 1, wherein the at least one processor corrects the acquired position information to suppress a position shift between the first image and the second image, and wherein the document image corresponding to the document is cropped from the second image based on the corrected position information.

9. The image processing apparatus according to claim 1, wherein the at least one processor acquires, in a case where the document is a rectangle in shape, coordinates of four vertexes of the rectangle as the position information of the document.

10. The image processing apparatus according to claim 1, wherein the unit at least one processor finds, in a case where the document is not a rectangle in shape, a minimum circumscribed rectangle of the document and acquires coordinates of four vertexes of the minimum circumscribed rectangle as the position information.

11. A method of crop processing for image data obtained by a scanner scanning an area including a document, the method comprising:

detecting an edge component of the document from a first image obtained by normalizing a signal value output from the scanner by using a first white reference, value;

acquiring position information of the document within the first image; and cropping, based on the acquired position information of the document, a document image corresponding to the document from a second image which is obtained by normalizing a signal value output from the scanner by using a second white reference value, wherein the first white reference value is higher than the second white reference value.

12. A non-transitory computer readable storage medium storing a program for causing a computer to perform:

detecting an edge component of a document from a first image which is obtained by normalizing a signal value output from a scanner scanning a document by using a first white reference value;

acquiring position information of the document within the first image; and cropping, based on the acquired position information of the document, a document image corresponding to the document from a second image which is obtained by normalizing a signal value output from the scanner by using a second white reference value, wherein the first white reference value is higher than the second white reference value.

* * * * *